United States Patent [19]

Fetouh

[11] Patent Number: 4,622,864

[45] Date of Patent: Nov. 18, 1986

[54] MODULAR CRANK SUBASSEMBLY AND BUILT-UP CRANKSHAFT THEREFOR

[75] Inventor: Mohamed A. Fetouh, Troy, Mich.

[73] Assignee: General Motors Corp., Detroit, Mich.

[21] Appl. No.: 740,713

[22] Filed: Jun. 3, 1985

[51] Int. Cl.$^4$ .............................. F16C 3/12; F16C 3/14
[52] U.S. Cl. ...................................... 74/597; 74/598; 74/605; 123/197 AC
[58] Field of Search .................. 74/595, 596, 597, 598, 74/605; 29/6; 123/197 AC

[56] References Cited

U.S. PATENT DOCUMENTS

| | | | |
|---|---|---|---|
| 1,024,817 | 4/1912 | Arnold | 74/597 |
| 1,031,785 | 7/1912 | Gulick | 123/195 R |
| 1,136,524 | 4/1915 | Hartwig | 74/598 |
| 1,278,784 | 9/1918 | Sturtevant | 123/195 R |
| 1,420,905 | 6/1922 | Bailey | 74/597 |
| 1,504,238 | 8/1924 | Hildebrand | 74/598 |
| 1,567,986 | 12/1925 | Ricardo | 74/597 |
| 1,874,444 | 8/1932 | Carvelli | 74/605 |
| 1,931,026 | 10/1933 | Lee | 74/595 X |
| 2,013,039 | 9/1935 | Dusevoir | 74/598 |
| 2,364,109 | 12/1944 | Taylor | 29/6 X |
| 2,448,742 | 9/1948 | Smith-Clarke et al. | 74/598 |
| 2,519,697 | 8/1950 | Paxman | 74/596 |
| 2,730,912 | 1/1956 | Marinelli | 74/605 X |
| 2,917,946 | 12/1959 | Fritz | 74/605 |
| 3,173,407 | 3/1965 | Sampietro et al. | 123/41.74 |
| 3,489,033 | 1/1970 | Jobling | 74/598 |
| 3,768,335 | 10/1973 | Mayer | 74/605 X |
| 3,842,938 | 10/1974 | Barnes-Moss | 74/605 X |
| 4,023,547 | 5/1977 | Reisacher | 123/196 R |
| 4,327,679 | 5/1982 | Crouch et al. | 123/195 R |
| 4,344,561 | 8/1982 | Iizuka et al. | 74/605 X |
| 4,351,278 | 9/1982 | Gaschler et al. | 123/195 R |

Primary Examiner—Alan Cohan
Assistant Examiner—John A. Rivell
Attorney, Agent, or Firm—Robert J. Outland

[57] ABSTRACT

A reciprocating piston machine, such as an internal combustion engine, includes a modular power transmission subassembly including a built-up crankshaft, integral unsplit crankshaft journal supports and bolt-less connecting rods to provide a lightweight low cost engine construction. A built-up crankshaft with improved oil lubrication means is also disclosed.

5 Claims, 4 Drawing Figures

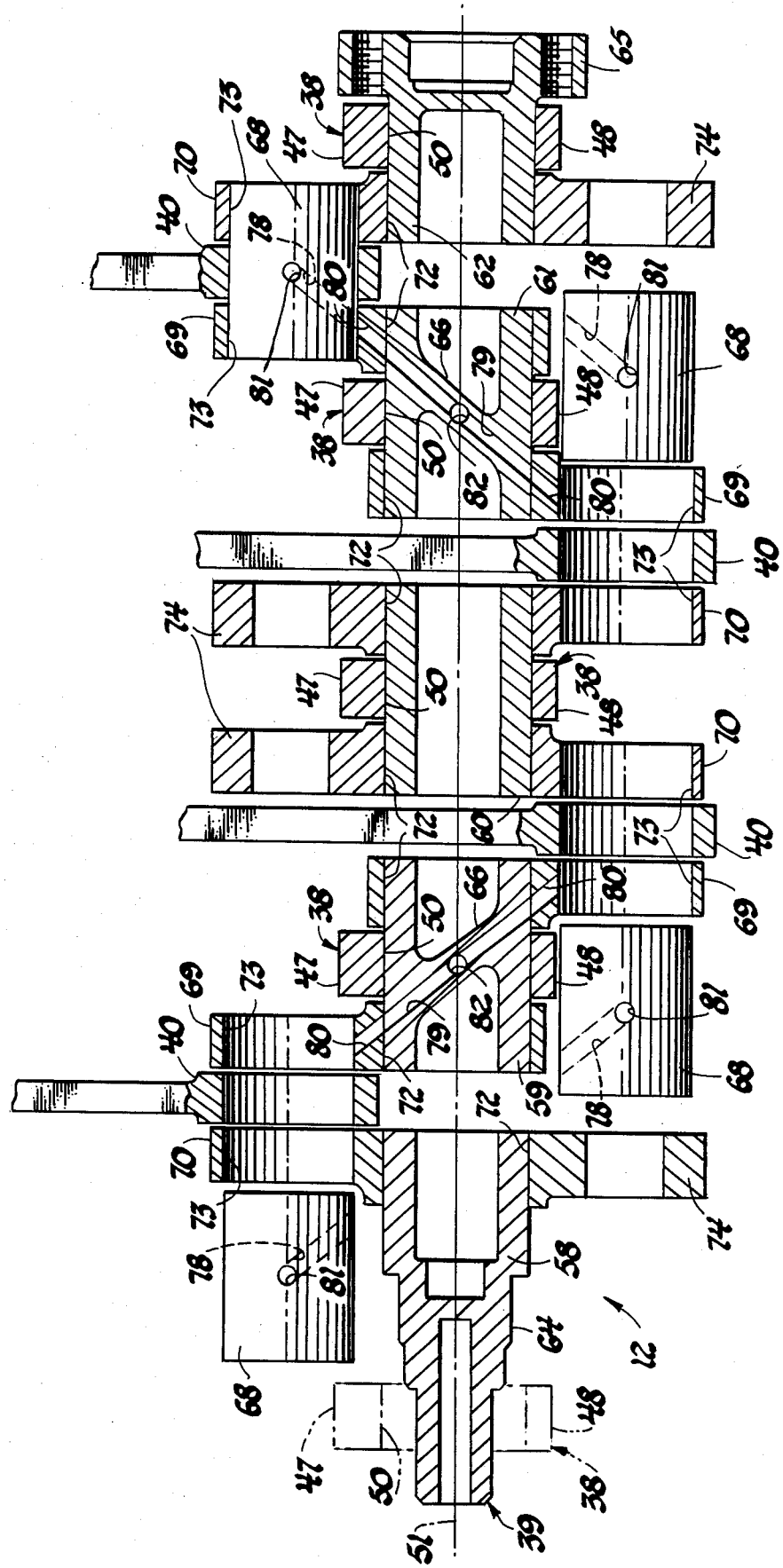

MODULAR CRANK SUBASSEMBLY AND BUILT-UP CRANKSHAFT THEREFOR

TECHNICAL FIELD

This invention relates to reciprocating piston machines such as internal combustion engines and the like. In particular the invention relates to modular subassemblies for engines and the like including a crankshaft and other moving elements and to a multipiece built-up crankshaft capable of use in such subassemblies.

BACKGROUND

It is known in the art to provide modular subassemblies of the power delivery components of an engine including a built-up crankshaft with connecting rods attached to the crank throws and pre-installed bearings. However, the bearings in these prior art arrangements appear to have either been of the anti-friction ball or roller type, requiring the application of separate bearing caps or other structure to support the crankshaft in the engine, or to involve multipiece split bearing assemblies not firmly secured in place before assembly on at least the intermediate main crankshaft journals.

Further, a lightweight hollow pin and journal built-up crankshaft arranged in an efficient and desirable manner for internal pressure lubrication appears to be absent from the prior art.

SUMMARY OF THE INVENTION

The present invention provides arrangements for a piston, machine such as an internal combustion engine utilizing a modular crank subassembly which is installable as a unit into the engine block from the crankcase end of the cylinders during final assembly of the engine. The modular subassembly includes a built-up multipiece crankshaft which is pressure oil lubricated and preassembled with unsplit connecting rods, pistons and integral journal support members, all of which are pressure oil lubricated.

The pre-assembled subassembly utilizes plain bearings within or formed as part of the integral bearing supports to provide a minimum of handling of separate components during engine assembly as well as a reduction of machining of the various elements, both of which reduce the cost of manufacture. Additionally, the use of integral bearing supports and the overall construction of the subassembly and cylinder block permit pre-machining of the subassembly components to provide sufficient accuracy for installation in the pre-machined engine block with bearing alignment potentially better than or at least as good as that obtained by the line boring of bearings usually performed in engines of more conventional construction.

These and other features and advantages of the invention will be more fully understood from the following description of a preferred embodiment taken together with the accompanying drawings.

BRIEF DRAWING DESCRIPTION

In the drawings:

FIG. 4 is a longitudinal cross-sectional view through a partially assembled modular subassembly of the crankshaft, connecting rods and support elements of FIG. 1 with the components aligned for final assembly.

DETAILED DESCRIPTION

Figure 1:
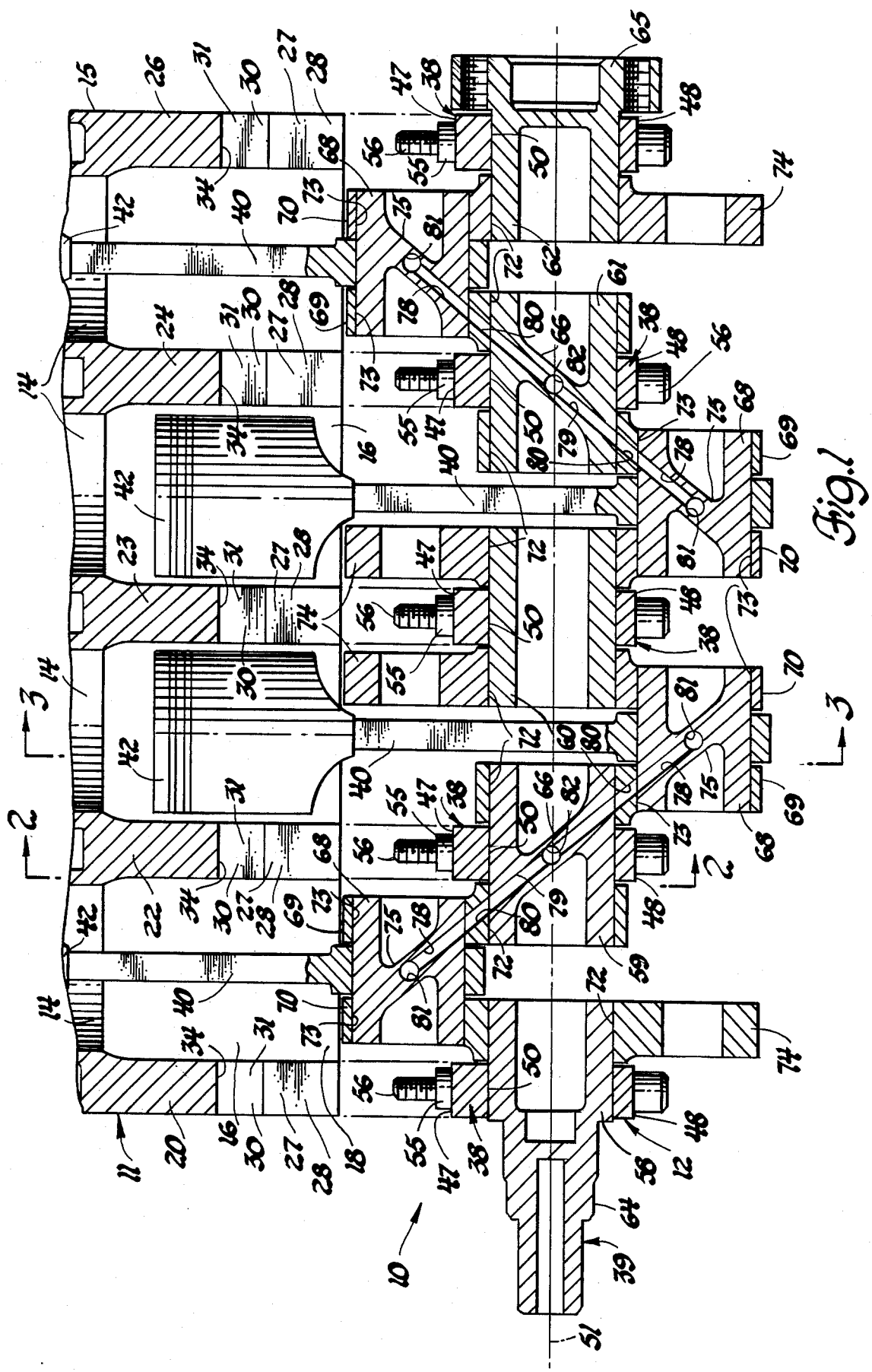
FIG. 1 is a longitudinal cross-sectional view showing the lower portion of a partially assembled engine including the crankcase portion of the block and a modular subassembly of the crankshaft, pistons and journal supports ready to be installed therein.
Figure 2:
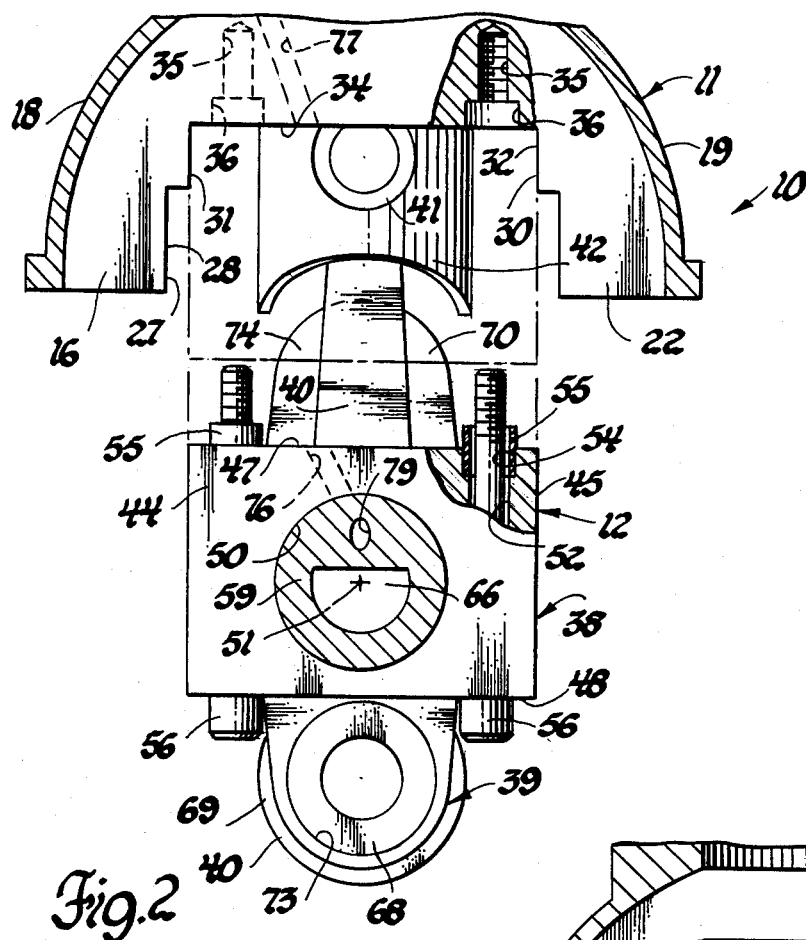
FIG. 2 is a transverse cross-sectional view through a main journal of the partially assembled engine as viewed from the plane indicated by the line 2—2 of FIG. 1.
Figure 3:
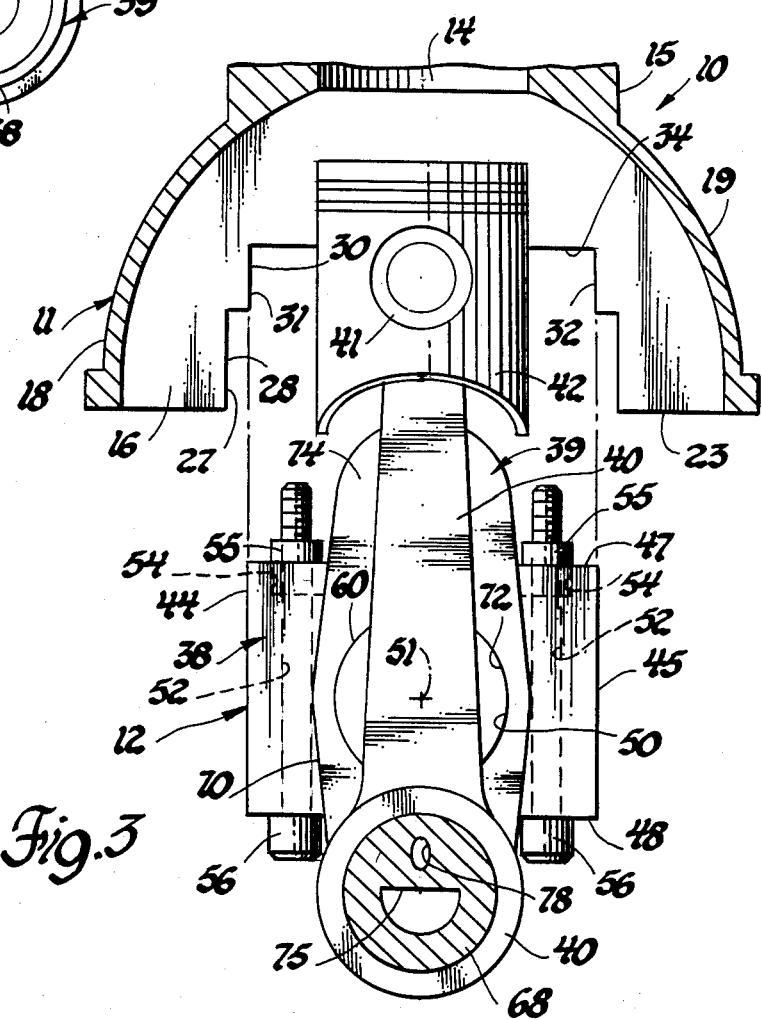
FIG. 3 is a transverse cross-sectional view through a crankpin of the partially assembled engine viewed from the plane indicated by the line 3—3 of FIG. 1.

In the drawings, numeral 10 generally indicates a partially assembled internal combustion engine including a cylinder block 11 of largely conventional construction and a modular subassembly 12 of power delivery components formed in accordance with the invention.

The cylinder block 11 comprises a cast or otherwise manufactured body defining a plurality of longitudinally aligned cylinders 14 defined within an upper portion 15 of the block and a crankcase cavity 16 formed in the lower portion by a pair of depending side walls 18, 19 transversely interconnected by bulkheads or weblike walls including a front wall 20, intermediate walls 22, 23, 24 and a rear wall 26.

In the bottom center portions of the transverse bulkhead walls, there are provided bearing support recesses 27 each of which preferably includes a relatively wide lower portion 28 and an upper portion 30 having laterally opposed shoulder like abutments defined by inwardly facing surfaces 31, 32 and a flat upper surface 34 defining the deepest portion of each recess 27. Above the recesses and within the transverse bulkhead walls, alignment and securing means are provided including laterally spaced vertically extending threaded bolt receiving openings 35 with counter-bored alignment sleeve receiving recesses 36 at the entrance to the openings 35 adjacent surface 34.

The modular subassembly 12 is made up of a number of preassembled elements including five integral (unsplit) crankshaft supports 38, a built up crankshaft generally indicated by numeral 39, four integral (bolt-less) connecting rods 40, four piston pins 41, and four pistons 42.

The crankshaft journal support members 38 are preferably formed as unitary elements sized to fit within the recesses 27 of the cylinder block transverse walls 20, 22, 23, 24 and 26. Each support member 38 includes lateral sides 44, 45 sized to fit closely within the shoulder surfaces 31, 32 respectively, of its respective recess 27, a flat upper side 47 adapted to engage the upper surface 34 of the recess and a lower side 48 extending well below the centerline of the associated crankshaft to enclose a journal thereof. In the present instance, the lower side 48 lies below the bottom of the cylinder block crankcase defining portion, in an area to be subsequently enclosed by an oil pan, not shown. The thickness of the supports is generally equal to that of the associated transverse webs or walls 20, 22, 23, 24, 26 to which they are attached, although the thickness could be greater or less if desired.

Each of the crankshaft journal support members 38 additionally includes a cylindrical journal opening 50 extending longitudinally therethrough, the journal openings of the various supports being aligned on a common axis 51 which is the crankshaft rotational axis. The journal supports 38 may be made of a suitable bearing material, such as aluminum, so that a bearing insert is not required. If desired, sleeve bearings, not shown, may be inserted into the openings 50 to act as journal bearings for the crankshaft.

To retain the respective support members 38 and the subassembly 12 in their assembled positions against the engine block, the support members are provided with fastener receiving openings 52 which extend vertically on either side of the journal openings 50 through the upper and lower sides 47, 48 and are aligned with the threaded openings 35 of the cylinder block transverse walls. Sleeve recesses 54 are counter-bored into the upper ends of the openings 52 in alignment with the mating recesses 36 of the cylinder block. Alignment sleeves or hollow dowels 55 are received in the recesses 54 and 36 to positively position the support members 38 in their proper locations on the block transverse walls. Machine screws 56 extend through the openings 52 and engage the threaded openings 55 of the block to hold the crankshaft supports 38 and the subassembly 12 in their assembled positions.

The connecting rods 40 and pistons 42 may be conventional construction, although it should be noted that the connecting rods are preferably of the bolt-less single piece type which minimizes their weight by avoiding the additional material necessary to provide for a removable cap and fasteners at the crankpin openings of the rods. Thus the manufacturing process is simplified and cost is reduced.

Further, in accordance with the invention, the built-up crankshaft 39 comprises a number of individually formed elements. These include five main journal members 58-62, each of which has at least a partially hollow interior to minimize weight. The front journal 58 is combined with a post-end portion 64 for attachment of the usual front end drive pulleys while the rear journal 62 is combined with a flanged end 65 for attachment with an output drive and flywheel in the usual manner. The center journal 60 is formed as a hollow sleeve while the intermediate journals 59 and 61 are hollow except for angled transverse webs 66 provided for lubrication passages to be subsequently described.

The built-up crankshaft 39 further includes four crank throws each made up of a crankpin 68 and a pair of crank arms 69, 70, each connected with their respective crankpin 68 and with adjacent ends of two adjacent main journal members. The crank arms 69, 70 each include a main journal opening 72 extending longitudinally along the crankshaft axis 51 and a cylindrical crankpin opening 73 located on an axis parallel with and equidistant from the crankshaft axis, the distance therefrom determining the crank throw. The crank arms 70 additionally include counterweight portions 74.

The crankpins 68 are fixedly retained within the crankpin openings 73 of their connected pairs of crank arms while the crank arms are in turn fixedly secured on the ends of the associated main journals 58-62 fixed within their respective main journal openings 72. The main journals are rotatably received within the cylindrical openings 50 of their respective journal support members 38 while the unitary bolt-less ends of the connecting rods 40 are carried upon the cylindrical crankpins 68 between their associated crank arms 69, 70. The crankpins 68 are of sleeve-like construction, essentially hollow inside except for angled webs 75 provided for lubrication passages to be subsequently described.

The main journal 58-62 and their bearings are pressure lubricated in conventional fashion through lubricant feed passages 76, 77, respectively located in the crankshaft journal supports 38 and the associated transverse walls 20, 22, 23, 24, 26 of the cylinder block. To provide for lubrication of the crankpin bearing surfaces at their rotatable connections with the connecting rods 40, the crankpins 68, intermediate main journals 59, 61 and the non-counterweighted crank arms 69 are provided with interconnecting lubrication passages 78, 79, 80, respectively which are aligned end to end to form a continuous passage extending from the centers of two adjacent crankpins through their associated crank arms and main journal. The passages 78, 79 of the crankpins and main journals extend through the angled webs 75, 66, respectively, while the passages 80 in the crank arms extend between the pin and journal openings 73, 72, respectively, in the plane of the crankshaft and crankpin axes. Transverse passages 81, 82 extend at right angles to the passages 78, 79 of the crankpins 68 and the intermediate journals 59, 61, respectively, to communicate the diagonal passages 78, 79, 80 with the exterior surfaces of the crankpins and main journals 59, 61 from which oil is supplied to the crankpins. Suitable grooves, not shown, may be provided in the bearing surface openings 50 of the support members 38, especially for the intermediate journals 59, 61 to assure adequate oil delivery to the crankpins.

The power components subassembly 12, as so far described, provides an efficient lightweight and easily manufactured power transmitting mechanism in which the materials of the various components of the built-up crankshaft and the attached elements can be selected to best perform their respective functions without limiting the choice of materials for the other separately formed elements. In addition, the use of bolt-less connecting rods and integral unsplit journal supports minimizes the mass of the supporting and connecting elements and, thus, the overall weight of the assembly.

The completed assembly is, as indicated in FIG. 1, easily installable within an associated cylinder block by inserting the pistons within the cylinders from below, moving the completed assembly into position with the journal supports 38 properly positioned in the transverse supporting walls 20, 22, 23, 24 and 26 then tightening the fastening screws 56 to fixedly secure the assembly within the block. In like fashion, replacement of a complete assembly may be accomplished by removing the assembly from the block in the reverse manner. However, it is expected that such an operation would be conducted by removing the engine from the vehicle for reconditioning and replacing the removed engine with a substitute or rebuilt exchange engine.

Referring to FIG. 4, the elements of the subassembly 12 are shown in their partially assembled condition for purposes of explaining the manner of assembly which may be accomplished, for example, in accordance with the following steps.

First the main journals are shrink fitted into their associated crank arms. In the case of all except the front journal 58, this requires prealignment of the crankshaft journal support members between or adjacent to the crank arms associated with each journal member and then the inserting of the journal within the crank arm and journal support openings, the crankpin having been preshrunk by freezing so that after installation its increased size fixes it in place within the crank arm openings. Proper orientation of the intermediate journals 59, 61 is required to align the oil passages 79, 80. The front journal 58 is merely shrink fitted within its single crank arm 70 since the reduced diameter of its post end 64 allows its journal support to be installed as a final step. If desired, or considered necessary in the case of a heavy duty crankshaft application, the crank arms and journals may be more strongly attached to one another by laser welding or the like after assembly.

As a second step, the various main journals and their attached crank arms are positioned in their proper relative final assembly positions, as shown in FIG. 4, after which the crankpins 68 are shrink fitted in their respective positions within the crankpin openings of their respective crank arms, care being taken to properly orient the crankpins so that their lubrication passages 78 connect with the passages 80 of their associated crank arms 69. The connecting rods 40 are, of course, positioned within the assembly prior to installation of the crankpins. In the case of some of the crankpins, such as that at the rear of the engine, it may be necessary to physically rotate the adjacent journal support member 38 between the assembly steps of the adjacent crankpins in order to provide clearance to allow positioning of the crankpin into its preassembly position. This, however, depends upon the length of the crank throw, the radial thickness of the journal support walls and related design considerations.

Third, after assembly of the crankpin at the front end, the front crankshaft journal support 38 may be slid into position over its main journal 58.

Fourth, the crankshaft support screws 56 and sleeves 55, as well as the piston pins 41 and pistons 42 associated with the connecting rods may then be assembled or attached if they have not previously been attached. The subassembly is then ready to be assembled within the engine cylinder block as previously described.

While the invention has been described by reference to a specific embodiment chosen for purposes of illustration, it should be understood that numerous modifications and changes could be made in the described details without departing from the inventive concepts disclosed. Accordingly, it is intended that the invention not be limited to the specific embodiment described, but that it have the full scope permitted by the language of the following claims.

I claim:

1. A modular subassembly for installation as a unit into a piston machine, said subassembly including
   a plurality of unitary crankshaft journal support members, each having a cylindrical journal opening, a mounting portion spaced from the opening and fastener receiving openings for securing said mounting portion against a mating portion of a cylinder block, said support members being longitudinally spaced with their journal openings aligned, and
   a multipiece crankshaft supported by said support members, said crankshaft including a plurality of longitudinally spaced and axially aligned cylindrical journals received one in each of the journal openings of said support members, and at least one crank throw between and connecting with each adjacent pair of said journals,
   said journals each having one end initially unconnected with an adjacent crank throw to permit installation of the unitary support members on their respective journals prior to final assembly of the multipiece crankshaft.

2. A modular subassembly for installation as a unit into an internal combustion piston engine or the like, said subassembly comprising
   a multipiece crankshaft having a plurality of cylindrical journal members spacedly disposed along a common axis and at least one crank throw between each adjacent pair of said journal members, each crank throw connected at axially opposite ends to the adjacent journal members to form a continuous crankshaft, and
   a plurality of unitary journal support members, one carrying each of said journal members, said support members each having a laterally extending body with an axial opening closely surrounding the associated journal member extending therethrough, a mounting portion on said body for connecting said support member with an associated engine cylinder block, and fastener receiving openings for securing each said support member to such a cylinder block.

3. A subassembly as in claim 2 wherein said crank throws each include a cylindrical crankpin member secured at axially opposite ends to a pair of crank arms connected in turn with said journal members and said subassembly further includes
   at least one connecting rod having an unsplit bearing portion permanently mounted on the crankpin member of each crank throw.

4. A subassembly as in claim 3 and further including oil passage means in at least one of said journal members and connecting with passage means in the attached crank arms and adjacent crankpin members, said passage means including a diagonal through passage intersecting parallel cross drilled passages in said journal member and the adjacent crankpin members to feed lubricant from the journal member to the crankpin members and connecting rods.

5. A built-up crankshaft for an internal combustion engine or the like, said crankshaft comprising
   a plurality of cylindrical main journal members including two end members and at least one intermediate member,
   a plurality of cylindrical crankpin members, and
   a plurality of crank arms, each having a crankpin opening and a main journal opening laterally spaced on predetermined parallel axes at distances equal to the crank throw,
   said main journal members being serially spaced along a common axis with opposed ends of adjacent journals being fixed within the main journal openings of like radially oriented pairs of said crank arms, each said pair having fixed within their crankpin openings the ends of one of said crankpins to thereby form throws of said crankshaft,
   said crankpins and certain of said main journals being hollow with open ends but having diagonal internal webs with angled lubricant passages therein aligned upon assembly and connected through passages in the crank arms to define flow paths between the crankpins and said certain main journals, and cross bores through said webs connecting with the passages in the crankpins and said certain main journals and extending to their outer surfaces to provide for oil flow from the outer surfaces of said certain main journals to the outer surfaces of their connected crankpins.

* * * * *